Oct. 8, 1929.                T. MIDGLEY                1,730,585
           METHOD AND APPARATUS FOR CUTTING BIAS STRIPS
                   Filed April 16, 1926        2 Sheets-Sheet 1
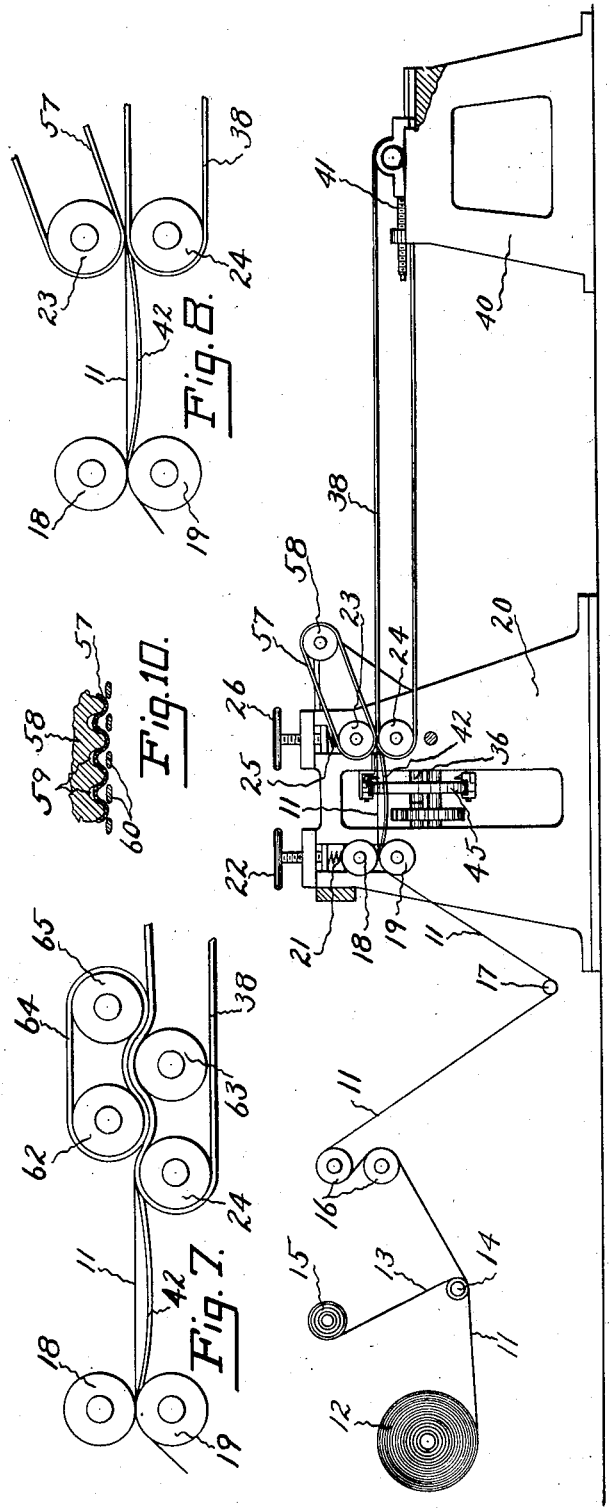
INVENTOR.
Thomas Midgley
BY
Edward C. Taylor
ATTORNEY.

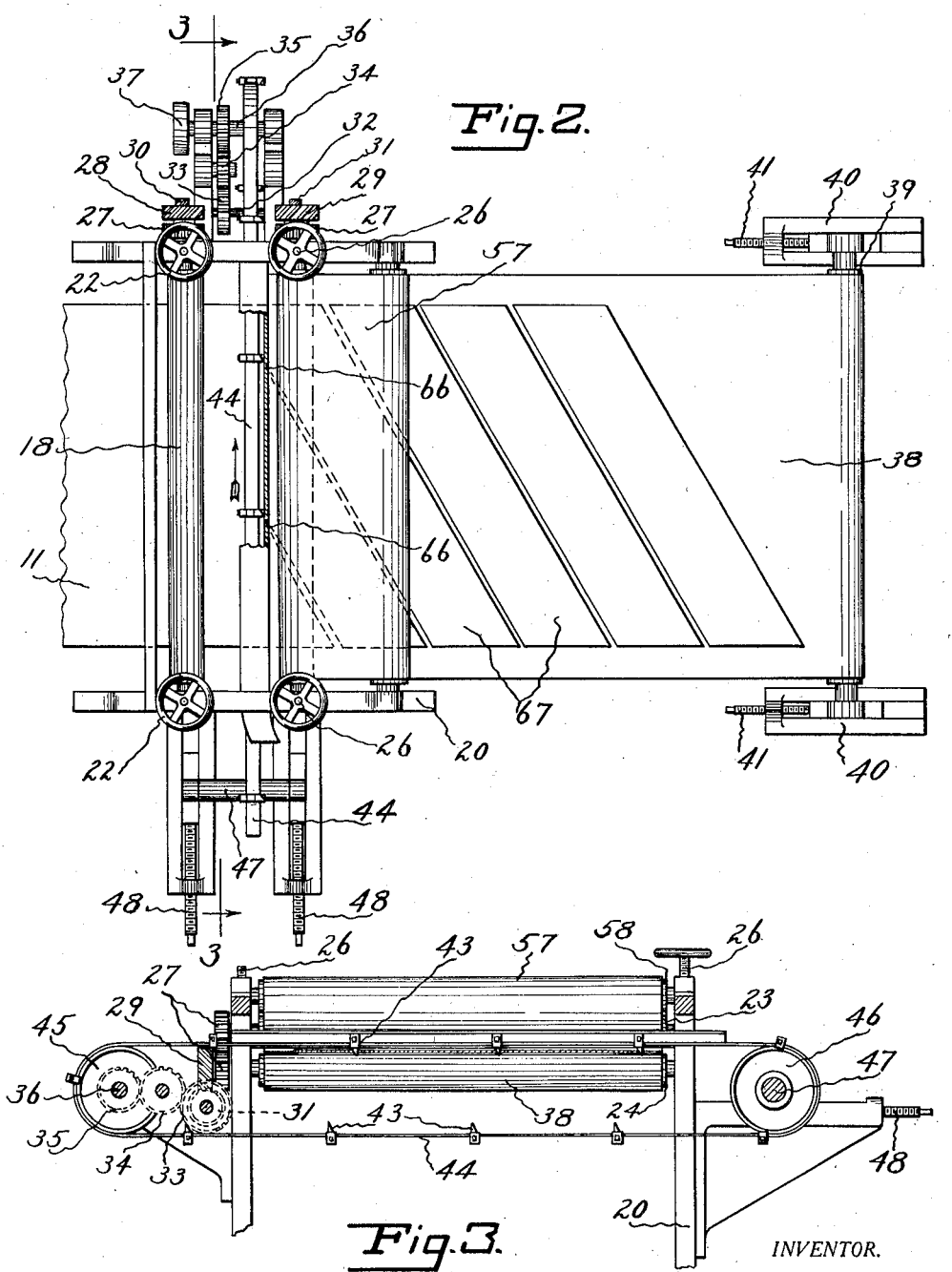

Patented Oct. 8, 1929

1,730,585

UNITED STATES PATENT OFFICE

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS

METHOD AND APPARATUS FOR CUTTING BIAS STRIPS

Application filed April 16, 1926. Serial No. 102,469.

This invention relates to a method and an apparatus for cutting bias strips from a continuous web of material. While it has been designed with particular reference to the cutting of bias strips from a web of rubberized cord fabric, the invention may be used in other fields.

One object of this invention is to produce bias cut strips with great accuracy and yet with an extremely simple mechanism. Another object is to produce a bias cutter which, because of the low cost of the apparatus involved, may be used at slow speeds; for example, in supplying bias cut strips to tire builders at the same rate as that at which they are to be used. Prior constructions of bias cutters have been so expensive that it has been necessary to reduce the number operated as greatly as possible. This has led to the practice of cutting the strips from the continuous web and storing the cut strips until needed by the building operators. By the use of a cutter having the simplicity of that herein to be described, this storing operation may be eliminated. A further object of the invention is to produce a cutter which can operate at a high speed if desired, and which can produce narrow strips with great rapidity. A further object of the invention is to provide a bias cutter which will deliver the bias strips in spaced condition, greatly facilitating their later handling. A further object of the invention is to deliver such spaced strips into a liner in which they may be wound up for storage if this manner of procedure is desired. Other and further objects of the invention will appear from the following description and claims. Referring to the drawings, Fig. 1 is a side elevation of a machine embodying the inventon, the supply for the web of material being shown diagrammatically;

Fig. 2 is a fragmentary top plan view thereof;

Fig. 3 is a section on line 3—3 of Fig. 2;

Figs. 4, 5 and 6 are detail views of the mounting for the individual cutter elements;

Fig. 7 is a side elevation of a modification;

Fig. 8 is a side elevation on a larger scale of portions of the apparatus shown in Fig. 1;

Fig. 9 is a detail section of a modification; and

Fig. 10 is a section on line 10—10 of Fig. 9.

The web of material to be cut is supplied in any desired way. As shown in Fig. 1, the material 11 is initially taken from a spool 12 upon which it is wound between turns of a liner 13. The web and the liner pass over a roll 14 and the liner is wound up on a spool 15. At 16 are shown feeding rolls of the usual type, and at 17 is shown a floating roller which operates to compensate for slight inequalities in the speeds of the feed and the cutting mechanism and serves to preserve a constant tension on the web. From the roll 17 the web passes between rolls 18 and 19 suitably journaled in a frame 20 and pressed together by springs 21 controlled by hand wheels 22. Spaced from the rolls 18 and 19 is a second pair of rolls 23 and 24 which are operated at a surface speed slightly faster, say about 14 per cent, than the rolls 18 and 19. This percentage has been found in practice to give satisfactory results for cuts six inches apart. The rolls 23 are pressed by springs 25 against lower rolls 24, the tension being controlled by hand wheels 26.

A convenient method of driving these rolls is shown in plan in Fig. 2. The two rolls of each pair are joined by gears 27 so that they rotate in opposite directions at the same surface speed. The shafts of the lower rolls 19 and 24 carry spiral gears 28 and 29 respectively, these gears meshing with similar gears 30 and 31 upon a short shaft 32. The ratios of the gear pairs 28, 30 and 29, 31 are so chosen as to give the slight difference in speed referred to. Shaft 32 carries a gear 33 meshing with an idle gear 34, which in turn meshes with a gear 35 on a shaft 36. This latter shaft carries a pulley 37 or other suitable means for the application of power.

The slight difference in surface speeds of the two pairs of rolls serves to place the web 11 under a slight tension over the distance between the roll pairs. This tension would, of course, be cumulative and would build up to a high degree if it were not for the release of tension occasioned by the cutting operation, as described below. As it is, the tension serves both to hold the material taut for cutting and to space the cut strips upon the delivery apparatus in a manner to be described more fully below. This latter apparatus consists, in the case shown, of a belt 38 which passes around roll 24 and around an idler 39 mounted upon a frame 40 and provided with the usual tightening mechanism 41. The diameter of roll 24 is, of course, chosen so that the surface speed of the belt passing around it rather than the surface speed of the roll itself will be that required for giving the necessary tension to the web. Preferably, in order to assist in threading the leading end of a web of material through the rolls at the start of the cutting operation, a curved guide 42 is fixed to the frame 20 so as to bridge the space between the rolls 19 and 24, as clearly shown in Fig. 8.

The cutting is accomplished by a series of cutting blades 43 held by suitable clamps to be described in spaced relation upon a steel belt 44. This belt passes around a pulley 45 fixed upon shaft 36 and around a second pulley 46 mounted upon an idle shaft 47 which is fixed upon the frame 20 by sliding journals operable by a belt tightening screw 48 in the usual manner. The cutters are carried by the belt directly across the path of the moving web 11, the resultant of the motion of the web and the motion of the cutters at right angles thereto being the bias line desired for the cut. This is shown in Fig. 2. The general method of cutting by a resultant of motions in this manner is described at some length in the patent to Marquette, No. 1,500,632 dated July 8, 1924, and need not be considered at length here. It will be apparent from the above description that the speed of travel of the cutters has a constant and definite relation to the speed of travel of the web, both motions being derived positively from the single drive shaft 36. This relation may be varied if desired, in order to change the angle of cut, by changing the ratio of the gear train connecting the shafts 32 and 36.

The clamps which hold the cutters 43 are composed of a body portion 49 which has a groove 50 encircling one side of the driving belt 44. A cap-piece 51 has a groove 52 encircling the other side of the driving belt. The knife 43 is held between members 53 and 54, all pieces of the clamp being held together by a screw or bolt 55. This screw passes completely through the clamp and, besides holding all pieces of the clamp assembled, draws the members 49 and 51 together so as to grip firmly the edges of the driving belt 44. Preferably the screw passes freely through members 53 and 51 and is threaded into member 49, member 51 being secured in place by a nut 55'. As shown in the drawings, the cutter preferably has a beveled cutting surface 56 and is set at an angle so that its plane lies in the diagonal path in which the cut is made.

In order to insure that the bias cut strips will lie upon the delivery belt 38 instead of going around roll 23, a belt 57 is mounted to pass around the latter roll and also around an idle roll 58 journaled in the frame 20. This belt may be made of a material having a smoother surface than the belt 38, which in itself would cause the strips, which in the preferred use of the invention are coated with rubber, to adhere to the belt 38 rather than to the belt 57. In case adhesion to the belt 57 does occur, however, its position projecting outwardly away from roll 23 gives the operator ample chance to pull off any adhering strips before they get back into the bite of rolls 23 and 24.

A further modification of this feature is shown in Figs. 9 and 10 in which the roll 58 is provided with grooves 59 into which belt 57 sinks. Into the valleys thus formed by the belt are fitted stripping fingers 60 mounted on brackets 61, the fingers serving to force the bias cut strips off from the surface of the belt 57.

A still further modification is shown in Fig. 7. The re-arrangement of parts here shown is intended to avoid sticking of the bias cut strips to the roll 23 or belt 57. By reducing the pressure per square inch exerted upon the web at this point the danger of adhesion is likewise reduced. In this modification the roll 23 is replaced by a roll 62 offset from roll 24 to a point half-way between that roll and an idle roll 63. The belt 57 is replaced by a belt 64 running around roll 62 and an idle roll 65. As will be apparent from Fig. 7, this arrangement greatly increases the surface contact and therefore reduces the intensity of pressure with which rolls 62 and 65 need to be forced downwardly.

The operation of the apparatus described, and the method of cutting which is performed by it, need but little further explanation. The web 11 is initially tensioned between the rolls 18, 19 and rolls 23, 24. As the cutters 43 are caused to travel transversely of the path of the web, cuts 66 are made as best shown in Fig. 2. Each cut releases the tension on the web as soon as it is made, with the result that the cut quickly opens and the bias cut strips 67 are delivered upon the belt 38 in slightly spaced condition. For the width of strip and speed ratio previously given this spacing will be about a quarter of an inch. This constant release of tension occasioned by the repeated severing of the web also prevents the tension building up to a harmful degree. The spacing of the cutters on the belt 44 can be varied as desired and the belt changed to a belt of another length in case the spacing desired is not an even factor of the length of the belt originally used. It will be obvious that very narrow width of bias strips can be produced readily by this means, although, if the width of strip is reduced greatly, it may be found desirable to increase the ratio of speeds of the two pairs of rolls so as to increase the tension. This is for the reason that the tension is released much more frequently in the cutting of narrow bands than in the cutting of wide bands.

Having thus described my invention, I claim:

1. A bias cutting machine comprising means for moving a web under tension, a cutter and means for moving the cutter transversely of the moving web to sever it along a bias line while tensioned.

2. A bias cutting machine comprising two pairs of web feeding rolls, means for driving the two pairs of rolls at slightly different speeds to feed towards the faster rolls and thereby to place under tension a web of material passing through them, and means for moving a cutter across the moving web along a line transverse to the path of travel of the web and between the two pairs of rolls.

3. A bias cutting machine comprising two pairs of web feeding rolls, means for driving the two pairs of rolls at slightly different speeds to feed towards the faster rolls and thereby to place under tension a web of material passing through them, means for moving a cutter repeatedly across the moving web along a line transverse to the path of travel of the web and between the two pairs of rolls, whereby the web will be severed along spaced diagonal lines and the tension upon it released simultaneously with the cut, and means for delivering the bias cut strips from the faster rolls at the same surface speed as the latter, whereby the bias cut strips will emerge from the machine in spaced relation.

4. A bias cutting machine comprising two pairs of web feeding rolls, means for driving the two pairs of rolls, a series of cutters mounted for successive and repeated passages transversely of the path of travel of the web and along a line located between the pairs of rolls, and means for moving the cutters at a speed bearing a definite relation to the speed of the web.

5. A bias cutting machine comprising two pairs of web feeding rolls, means for driving the two pairs of rolls at slightly different speeds to feed towards the faster rolls and thereby to place under tension a web of material passing through them, and an endless carrier bearing a series of spaced cutters and mounted to carry the cutters transversely to the path of travel of the web and along a line between the two pairs of rolls, whereby the web will be severed into a series of bias cut strips while under tension.

6. A bias cutting machine comprising means for progressively tensioning a moving web of material, and means for repeatedly severing the web while under tension along lines running transversely of the path of travel of the web but diagonally of the web itself, whereby the tension on the web is released and the bias cut strips so produced are spaced from each other.

7. A method of cutting a traveling web of material into bias strips, which comprises maintaining the web under tension and cutting the web at successive intervals, while under tension, along lines running transversely of the path of travel of the web and consequently diagonally of the web itself.

THOMAS MIDGLEY.